United States Patent
Shay et al.

(10) Patent No.: US 6,705,571 B2
(45) Date of Patent: Mar. 16, 2004

(54) SYSTEM AND METHOD FOR LOADING STORES ON AN AIRCRAFT

(75) Inventors: William F. Shay, Virginia Beach, VA (US); Craig Smith, Virginia Beach, VA (US)

(73) Assignee: Northrop Grumman Corporation, Newport News, VA (US)

( * ) Notice: Subject to any disclaimer, the term of this patent is extended or adjusted under 35 U.S.C. 154(b) by 0 days.

(21) Appl. No.: 10/201,085

(22) Filed: Jul. 22, 2002

(65) Prior Publication Data

US 2004/0011926 A1 Jan. 22, 2004

(51) Int. Cl.$^7$ .............................. B64D 9/00; B64C 1/22
(52) U.S. Cl. ................................. 244/137.1; 244/137.4
(58) Field of Search .......................... 244/137.1, 137.4, 244/136, 147; 89/1.54, 1.59; 294/82.26, 82.2–82.3; B64D 9/00, 1/12, 7/00; B64C 1/22

(56) References Cited

U.S. PATENT DOCUMENTS

| | | | | |
|---|---|---|---|---|
| 3,677,506 A | * | 7/1972 | La Roe | 244/137.4 |
| 3,771,416 A | | 11/1973 | Ackerman et al. | |
| 3,911,786 A | * | 10/1975 | Scheetz et al. | 89/1.51 |
| 3,954,233 A | * | 5/1976 | Hasquenoph et al. | 244/137.4 |
| 4,056,248 A | * | 11/1977 | Hasquenoph et al. | 244/137.4 |
| 4,129,271 A | * | 12/1978 | Hasquenoph et al. | 244/137.4 |
| 4,168,047 A | * | 9/1979 | Hasquenoph et al. | 244/137.4 |
| 4,616,793 A | * | 10/1986 | Hassler, Jr. | 244/137.4 |
| 4,750,691 A | * | 6/1988 | Hollrock et al. | 244/137.1 |
| 5,915,290 A | * | 6/1999 | Coleman et al. | 89/1.59 |

* cited by examiner

Primary Examiner—Charles T. Jordan
Assistant Examiner—Stephen Holzen
(74) Attorney, Agent, or Firm—Hunton & Williams LLP

(57) ABSTRACT

An embodiment of the present invention provides a loading system for loading a stores item onto a release unit attachable to an aircraft structure, the release unit having a release actuation assembly including an actuator arm. The loading system comprises at least one hook pivotably mountable to the release actuation assembly. The hook has a pivot pin passage formed therethrough, a stores engagement portion and an actuation portion. The stores engagement portion is configured for engaging a lifting structure of the stores item. The actuation portion is configured for engagement by the actuator arm of the release actuation assembly to pivot the at least one hook and disengage the stores engagement portion from the lifting structure of the stores item. The loading system further comprises a pivot pin configured for insertion into the pivot pin passage. The pivot pin is removably mountable to the release actuation assembly for pivotably mounting the at least one hook thereto. The loading system also comprises at least one cable attached to an associated one of the at least one hook; and a winch assembly attachable to the aircraft structure. The winch assembly is configured for selectively winding and unwinding each of the at least one cable.

26 Claims, 13 Drawing Sheets

SYSTEM AND METHOD FOR LOADING STORES ON AN AIRCRAFT

BACKGROUND OF THE INVENTION

The present invention relates generally to aircraft stores loading systems and, more particularly to a versatile, integrally mounted loading system that can be retrofitted to existing aircraft weapons and ordnance systems.

Certain military aircraft such as fighter aircraft carry externally mounted weapons such as bombs or missiles, ordnance and fuel tanks that may be selectively jettisoned during flight. Such items, collectively referred to herein as "stores," are releasably attached to the aircraft structure using specialized racks or release units. Attachment points for these units may include hard points on the aircraft fuselage, wing tips and wing-mounted pylons. In certain aircraft, similar racks or release units may be carried internally in a weapons bay that may be opened during flight to release stores mounted therein.

Aircraft turnaround time (sortie rate) is determined to a large extent by the rate at which stores can be loaded and, in some circumstances, removed. In order to improve turnaround time, several systems have been developed for raising and attaching heavy stores to aircraft release units. Current systems, however, may require as many as five men and 10–18 minutes to load a single weapon. Further, current systems are typically inflexible in that they are adapted to particular weapon or ordnance types. In some instances, the system requires that the stores be separately attached to the release unit, which is then lifted into place for attachment to the aircraft.

One example of present technology that is used by the Navy employs a gasoline powered winch mechanism to hoist a weapon into place for attachment to hooks extending downward from a release unit. This particular system requires extensive manpower and rigging and cannot be used for such items as drop tanks and reconnaissance pods. The system also requires a hoist arrangement with numerous adapters that are aircraft and weapon specific.

SUMMARY OF THE INVENTION

The present invention provides a versatile, reliable loading system that can be used for many types of weapons, ordnance and external tanks and that can be adapted to current aircraft release systems.

An embodiment of the present invention provides a loading system for loading a stores item onto a release unit attachable to an aircraft structure, the release unit comprising a release actuation assembly including an actuator arm. The loading system comprises at least one hook pivotably mountable to the release actuation assembly. Each of the at least one hook includes a pivot pin passage formed therethrough, a stores engagement portion and an actuation portion. The stores engagement portion is configured for engaging a lifting structure of the stores item. The actuation portion is configured for engagement by the actuator arm of the release actuation assembly to pivot the at least one hook and disengage the stores engagement portion from the lifting structure of the stores item. The loading system further comprises a pivot pin configured for insertion into the pivot pin passage. The pivot pin is removably mountable to the release actuation assembly for pivotably mounting the at least one hook thereto. The loading system also comprises at least one cable with each of the at least one cable being attached to an associated one of the at least one hook; and a winch assembly attachable to the aircraft structure. The winch assembly is configured for selectively winding and unwinding each of the at least one cable.

Other objects and advantages of the invention will be apparent to one of ordinary skill in the art upon reviewing the detailed description of the invention.

DETAILED DESCRIPTION OF THE INVENTION

Figure 1:
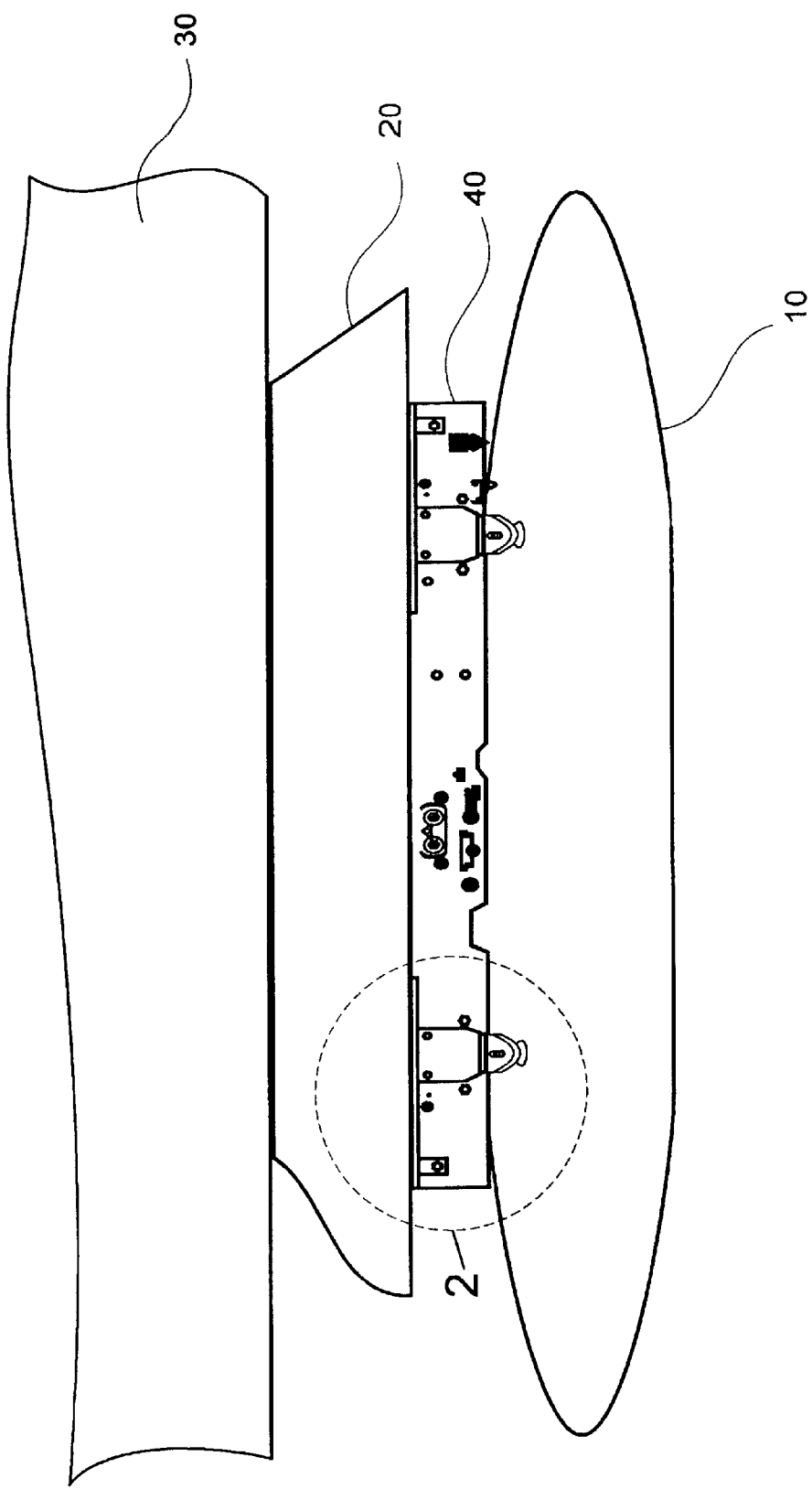
FIG. 1 is a side view of a stores item attached to an aircraft structure by a conventional release unit.
Figure 2:
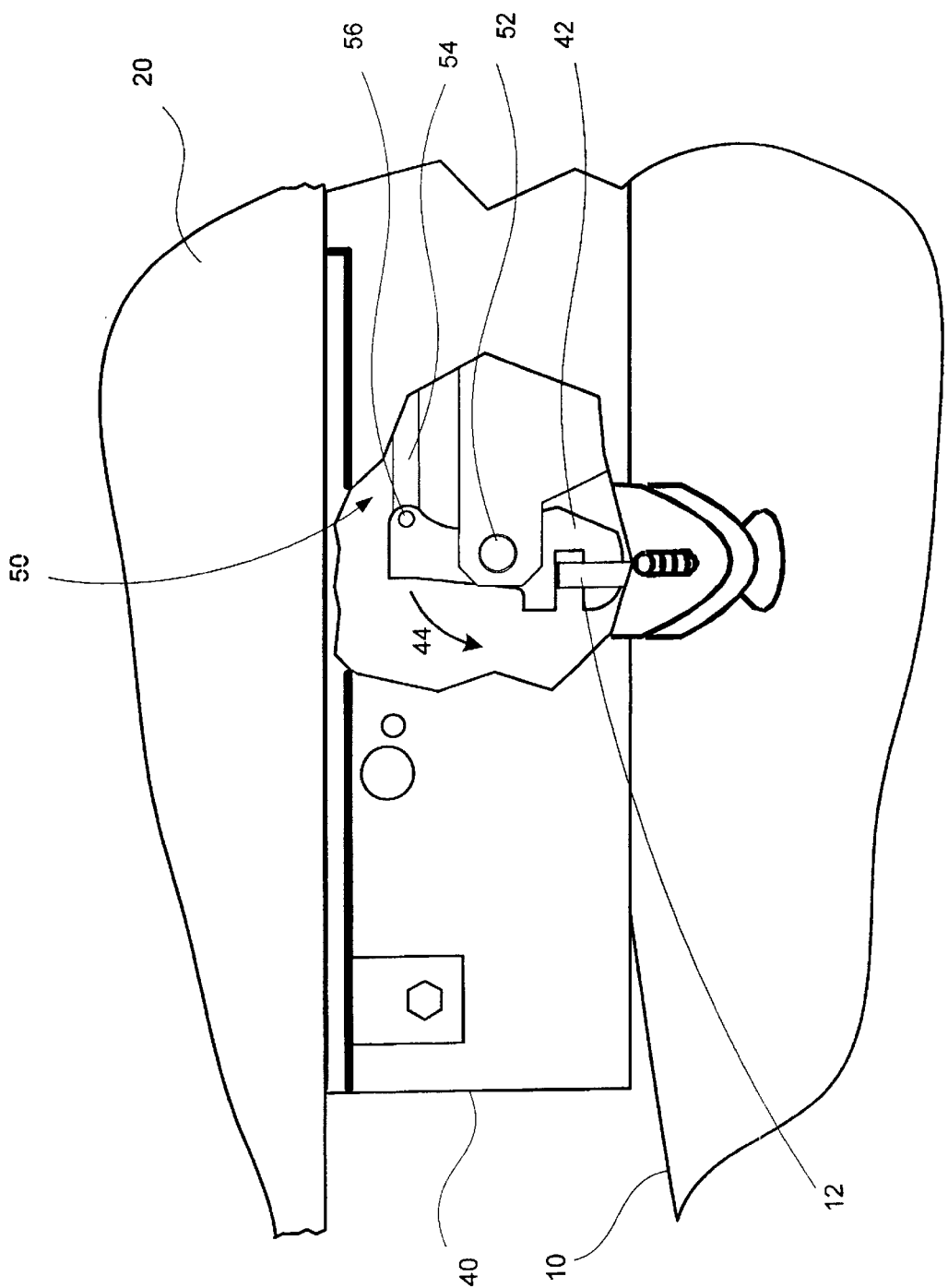
FIG. 2 is a detail view of a portion of the conventional release unit of FIG. 1.

The present invention provides a stores loading system that is readily adaptable to current aircraft weapons, ordnance and external fuel tank mounting and release systems. A typical system used on such aircraft as the F/A-18 is depicted in FIGS. 1 and 2. In these illustrations, a stores item 10 is attached to a pylon 20 using a release unit 40. The pylon 20 is in turn attached to an aircraft structure 30. The aircraft structure 30 may be a portion of the aircraft's wing or fuselage or may be an internal rack housed in a bomb bay. The release unit 40 uses a pair of hooks 42 to engage and retain two attachment lugs 12 attached to the upper surface of the stores item 10. As shown in FIG. 2, each hook 42 is pivotably mounted to a release actuation assembly 50 by a pivot pin 52. The release actuation assembly 50 includes an actuator arm 54 that is pivotably attached to the upper end of the hook 42 by an actuator arm pin 56. The release actuation assembly 50 and hook 42 are configured so that the actuator arm 54 can be selectively translated to pivot the hook 42 around the pivot pin 52. When the hook 42 is pivoted in the release direction 44, the hook 42 disengages the attachment lug 12, releasing the stores item 10. The release unit 40 and, in particular, the release actuation assembly 50, are configured to simultaneously pivot both hooks 42 to release the stores item 10 during flight. The release unit 40 is also configured to provide electrical or other communication between the stores item 10 and the various systems of the aircraft.

Currently, stores are loaded on an aircraft either by raising them to the attached release unit 40 and positioning the attachment lugs 12 so that they may be engaged by the hooks 42, or by separately attaching the stores to the release unit 40, which is then raised into place and attached to the aircraft. Both of these methods have significant disadvantages. The first method requires that the stores be supported or suspended in some manner that allows alignment and positioning of the lugs for engagement of the hooks 42. Because of the mass and bulk of various stores, this process can require relatively complex rigging or support equipment. Some systems that use this method, require modification of the stores themselves. Such systems are typified by the approach described in U.S. Pat. No. 4,168,047, where specialized suspension members are used to replace the standard lugs typically used to attach stores.

The second method, typified by the approach described in U.S. Pat. No. 5,915,290, requires that the entire release unit be disconnected from the aircraft. This can result in significant operational problems. For safety reasons, weapons systems may not be energized during weapons loading. If a weapon and release unit are simultaneously loaded and connected to the aircraft, proper communication of the release unit with on-board aircraft weapon systems cannot be verified until aircraft power is applied and a bit check is performed. Subsequently identified problems associated with the connections between the release unit and the aircraft cannot be checked or corrected until the weapon is unloaded.

Another disadvantage of the systems described in U.S. Pat. No. 5,915,290 is that they require significant modification of the release unit and the attachment mechanisms used to attach the release unit to the aircraft structure.

Embodiments of the present invention provide a stores loading system that does not require modification of existing stores and requires only minimal modification of existing release units. In an exemplary embodiment of the invention, the stores attachment hooks are selectively detachable from the release actuation assembly of a release unit. In this embodiment, the hooks are slightly modified to allow attachment of cables from which the hooks may be suspended. These cables are passed through openings in the upper surface of the release unit and into the pylon or other aircraft structure to which the release unit is attached. The cables are then passed over one or more pulley wheels to a winch assembly. The winch assembly may be disposed within any supporting aircraft structure such as a pylon, wing, fuselage or bomb bay. The winch assembly is configured to be driven by a portable power unit to selectively raise and lower the hooks of the release unit. A stores item is loaded by positioning the stores item on the ground or deck beneath the aircraft hard point to which the release unit is attached. The hooks are then detached from the release unit and lowered to the stores item where they can be easily attached to the lugs of the stores item. The portable power unit is then used to drive the winch assembly which winds the cables to simultaneously raise the two hooks and the attached stores item to the release unit. When the stores item and the hooks are properly positioned, the hooks are reconnected to the release actuation assembly to hold the loaded stores item in place.

As will be discussed in more detail hereafter, the winch assembly is preferably configured to allow both simultaneous and separate winding of the two cables using a single portable power unit.

Figure 3:
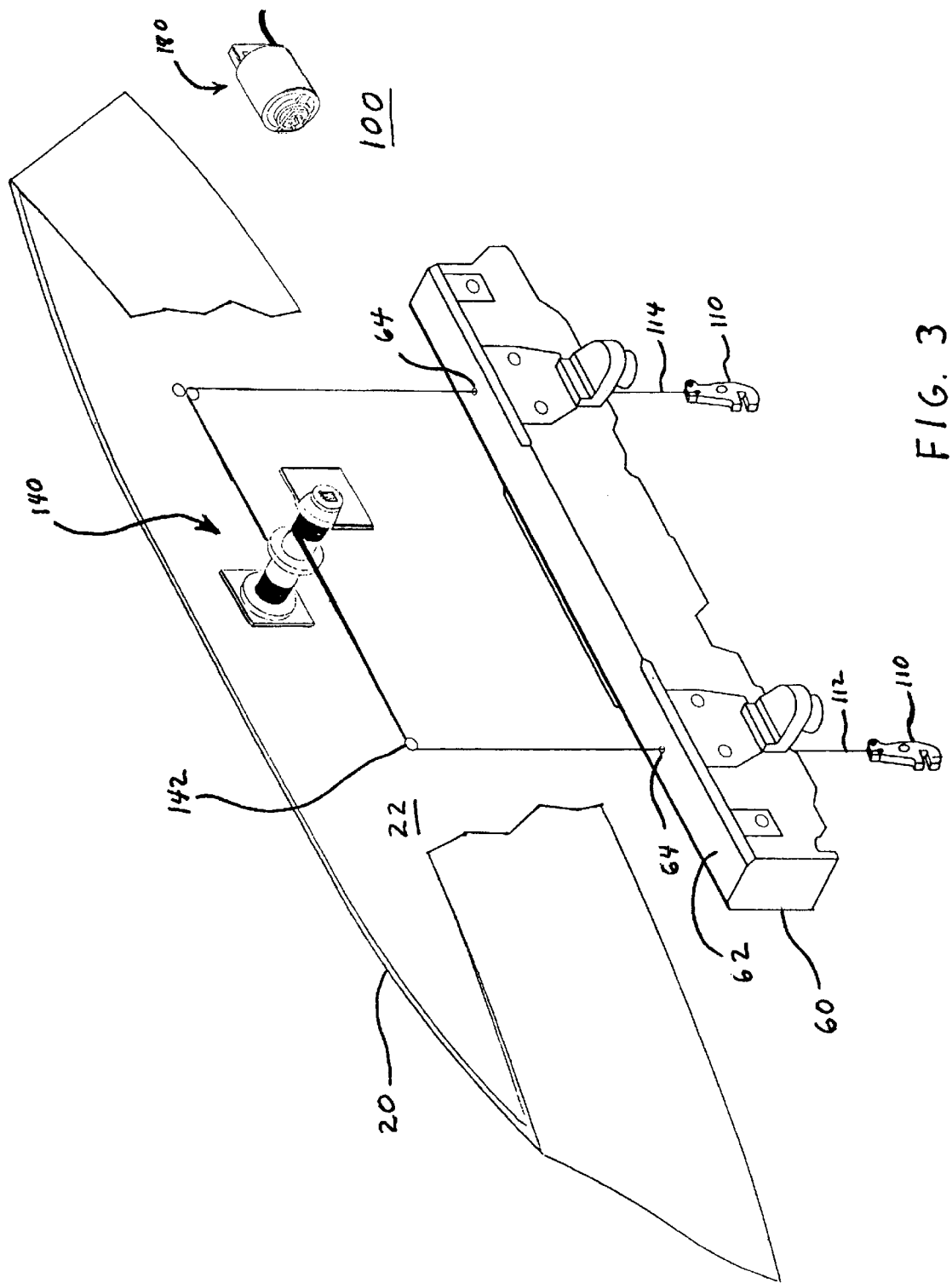
FIG. 3 is an exploded perspective view of a loading system according to an embodiment of the invention.

With reference to FIGS. 3–13, embodiments of the invention will now be discussed in more detail. FIG. 3 illustrates an exploded view of a loading system 100 according to the present invention in conjunction with a conventional release unit 60. The loading system 100 includes a forward attachment hook 110 attached to a forward cable 112, a rear attachment hook 110 attached to a rear cable 114, a winch assembly 140 mounted within a pylon 20 or other aircraft structure, pulleys 142 for routing the cables 112, 114 and a portable power unit 180 configured for engaging and driving the winch assembly 140.

Figure 4:
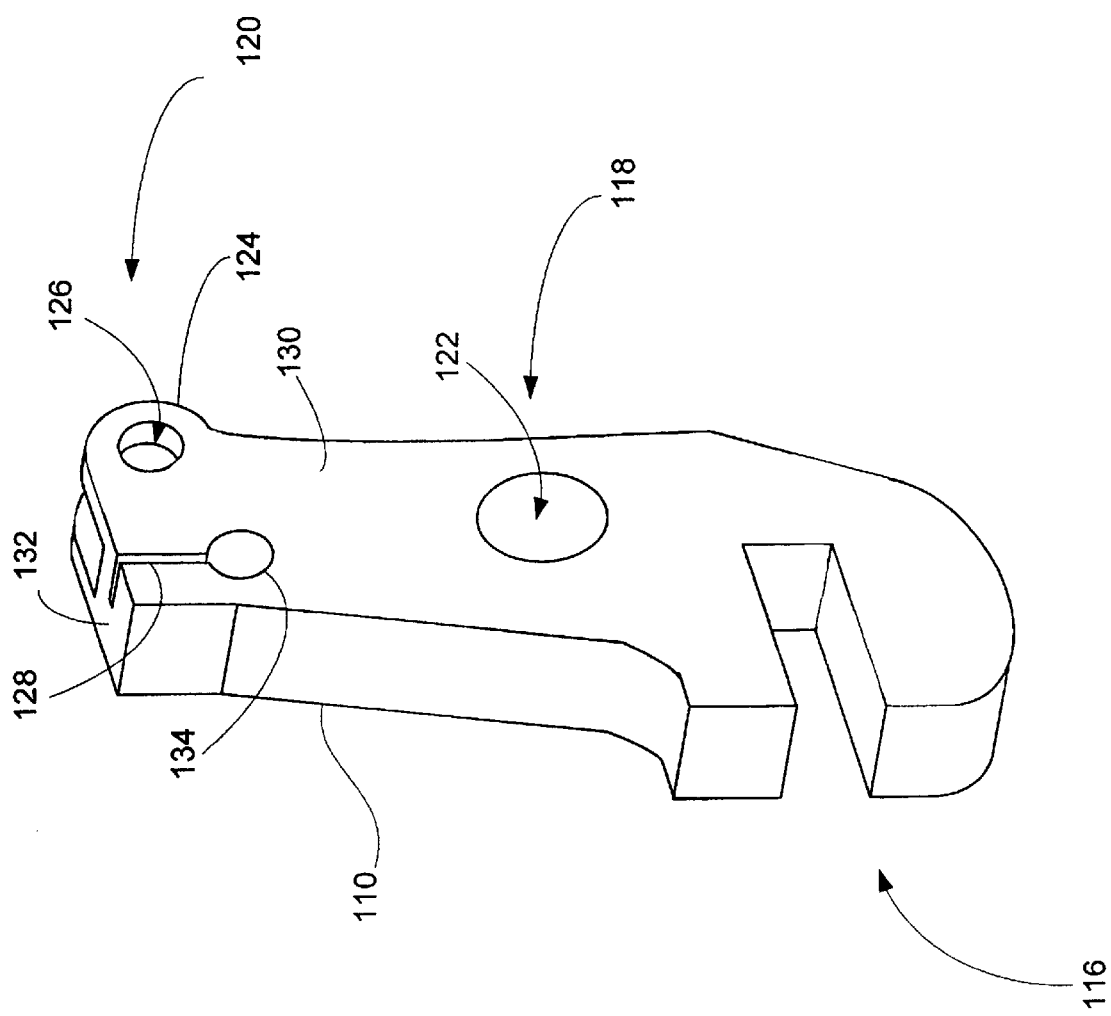
FIG. 4 is a perspective view of a hook of a loading system according to an embodiment of the invention.
Figure 5:
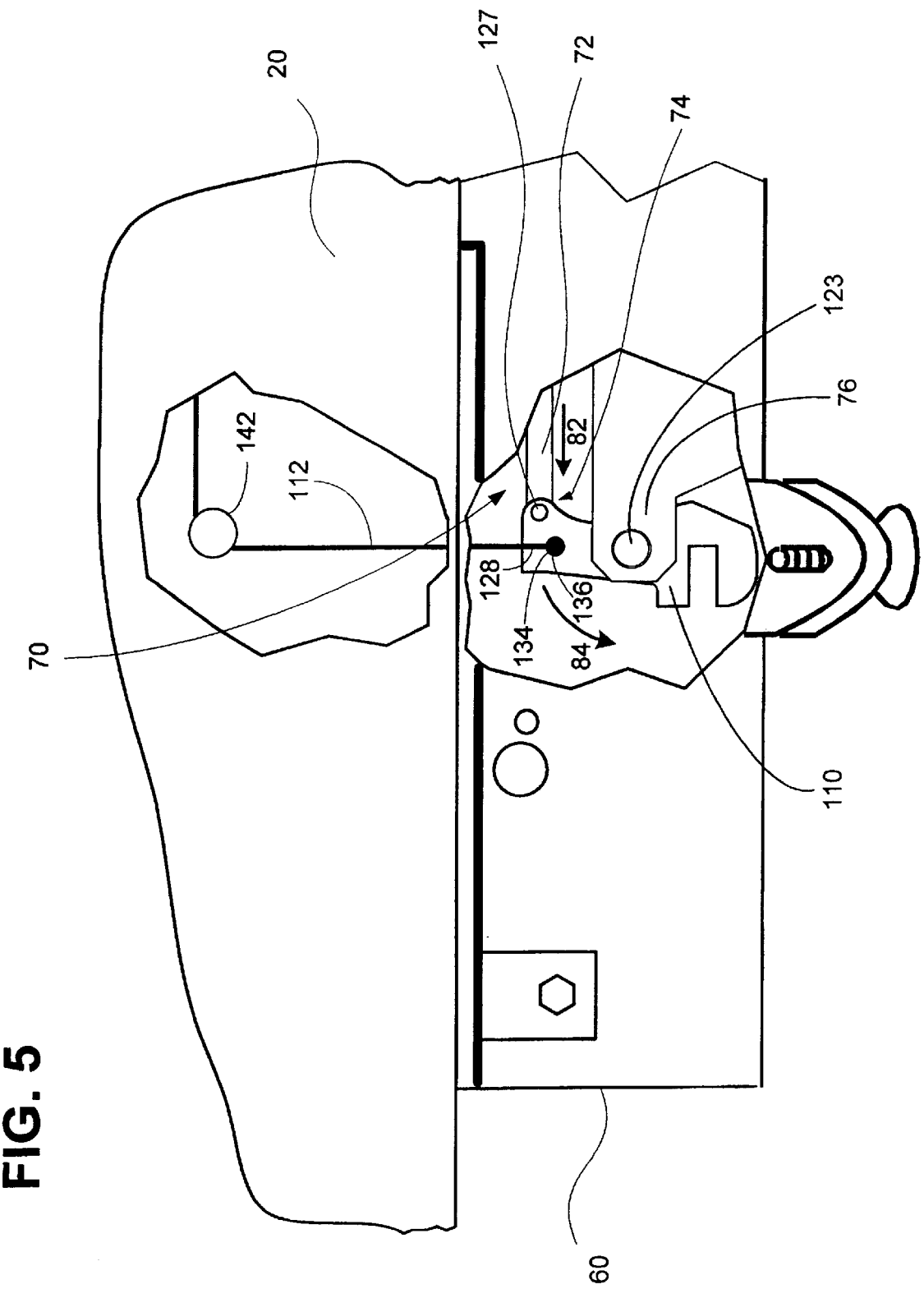
FIG. 5 is a detail side view of a hook of a loading system according to an embodiment of the invention, the hook being attached to a release actuation assembly of a release unit.
Figure 6:
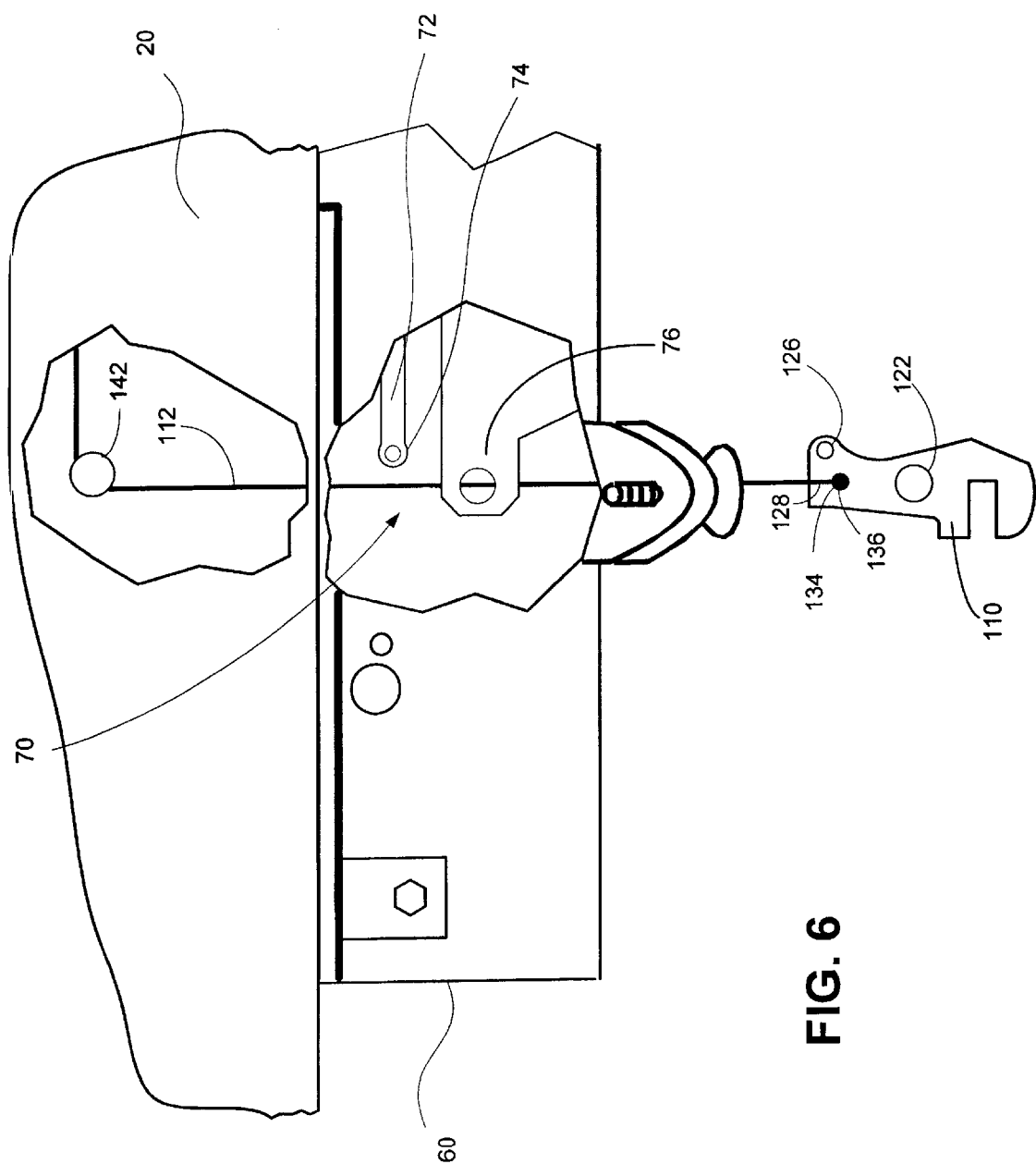
FIG. 6 is a detail side view of a hook of a loading system according to an embodiment of the invention, the hook being detached and lowered from a release unit.

As shown in FIGS. 4 and 5, the attachment hooks 110 are configured for selective attachment to the release actuation assembly 70 of the release unit 60. Each attachment hook 110 has a stores engaging portion 116 configured for engaging a lifting lug of a stores item, a central portion 118 and an actuation portion 120. The central portion 118 includes a cylindrical pivot pin passage 122 therethrough. The pivot pin passage 122 is configured to accept a pivot pin 123 that retains the central portion 118 of the hook 110 in rotatable engagement with a hook mounting portion 76 of the release actuation assembly 70. The actuation portion 120 of the hook 110 includes a clevis 124 with an actuator pin passage 126 therethrough. The clevis 124 is configured to engage and accept the distal end 74 of an actuator arm 72 of the release actuation assembly 70. The actuator pin passage 126 is configured to accept an actuator pin 127 that retains the distal end 74 of the actuator arm 72 in rotatable engagement with the clevis 124.

It will be understood by those having ordinary skill in the art that when the hook 110 is attached to the hook mounting portion 76 using the pivot pin 123 and to the actuator arm 72 using the actuator pin 127, translation of the actuator arm 72 will cause the hook 110 to rotate about the pivot pin 123. If the hook 110 is in the loaded position shown in FIG. 5, translation of the actuator arm 72 in the release direction 82 causes the hook 110 to rotate in the rotational release direction 84. This causes the stores engaging portion 116 to disengage from the stores item, releasing it from the aircraft.

In an alternative embodiment, the hook 110 may be configured so that the distal end 74 of the actuator arm 72 engages the actuation portion 120 of the hook 110 but is not connectable to it. In this embodiment, the actuator arm 72 operates only in a "push" mode wherein movement of the actuator arm 72 in the release direction will cause the distal end 74 of the actuator arm 72 to engage the actuation portion 120 of the hook 110 and cause it to rotate in the rotational release direction 84. However, movement of the actuator arm 72 in the opposite direction will not rotate the hook 110 because there is no pin connecting the two structures. This embodiment is advantageous in that the elimination of the actuation pin reduces the steps involved in disconnecting the hook 110 from the release actuation assembly 70.

In other embodiments, the actuation portion 120 of the hook 110 may be configured to capture the distal end 74 of the actuator arm 72 in a socket when the hook 110 is raised into position for insertion of the pivot pin 123. The distal end 74 of the actuator arm 72 may be reconfigured to facilitate the capture process and to provide a pivotable connection to the hook 110.

The loading system 100 is intended to be easily adaptable to multiple release unit configurations. Accordingly, the exact geometry and relative positions of the features of the hook 110 may be determined at least in part by the configuration of the release unit 60 and, in particular, the release actuation assembly 70. When a first type of release unit is replaced with a second type of release unit, the hooks configured for use with the first release unit can be easily switched out for hooks configured for use with the second release unit.

To accomplish this, the hook 110 includes a cable attachment arrangement that preferably allows for selective attachment and detachment of the hook 110 to either one of the cables 112, 114. In one embodiment, the hook 110 includes a cable slot 128 formed through the forward face 130 and top surface 132 of the hook 110 (see FIG. 4). The cable slot 128 has a width dimension that is slightly larger than the diameter of the cables 112, 114. The cable slot 128 connects to a keyhole 134 that is configured to accept a retainer block 136 attached to the end of each of the cables 112, 114 (see FIGS. 5 and 6). Although the keyhole 134 and retainer block 136 are depicted as circular cylinders, it will be understood that other geometries may also be used such as polygonal cylinders, elliptical cylinders and prisms. The keyhole 134 and retainer block 136 may also be formed with a taper. The keyhole 134 may be formed as a through hole and the retainer block 136 sized so that it extends out of both ends of the keyhole 134. The retainer block 136 may then be held in place through means such as cotter pins or the like.

It will be understood that other mechanisms may be used to removably attach the hook 110 to the cables 112, 114. For example, the hook 110 may be attached using a swivel mechanism (not shown). The hook 110 may also be permanently attached to the cable end using any conventional method such as welding.

The cables 112, 114 may be formed from any suitable high strength material. Suitable materials include but are not limited to stainless steel and kevlar or other high strength synthetic fiber. The cables may be formed in a flat, belt-like configuration or as a substantially cylindrical braid. A preferred cable configuration is a ¼-in. stainless steel braid.

The cables 112, 114 are passed through cable passage holes 64 in the upper wall 62 of the release unit 60 and into an interior cavity 22 of the pylon 20 or other aircraft structure to which the release unit 60 is attached. The cables 112, 114 are then routed through the interior cavity 22 to the winch assembly 140 using pulleys 142 as required.

The winch assembly 140 is configured for simultaneously or independently winding and unwinding the forward and rear cables 112, 114 to raise and lower the hooks 110. In a preferred embodiment illustrated in FIGS. 7, 9 and 10, the winch assembly 140 includes a reel unit 141 mounted to the pylon 20 or other aircraft structure using a pair of mounting plates 144, 146. The reel unit 141 includes a first reel 150 and a second reel 160. The first reel 150 includes a first cylindrical reel drum 151 with circular flanges 152, 153 mounted at its ends. The second reel 160 includes a second cylindrical reel drum 161 with circular flanges 162, 163 mounted at its ends. The first and second reels 150, 160 are rotatably mounted to the mounting plates 144, 146 so as to have a common axis of rotation 148 and so that they can be driven by a single power unit 180.

Figure 10:
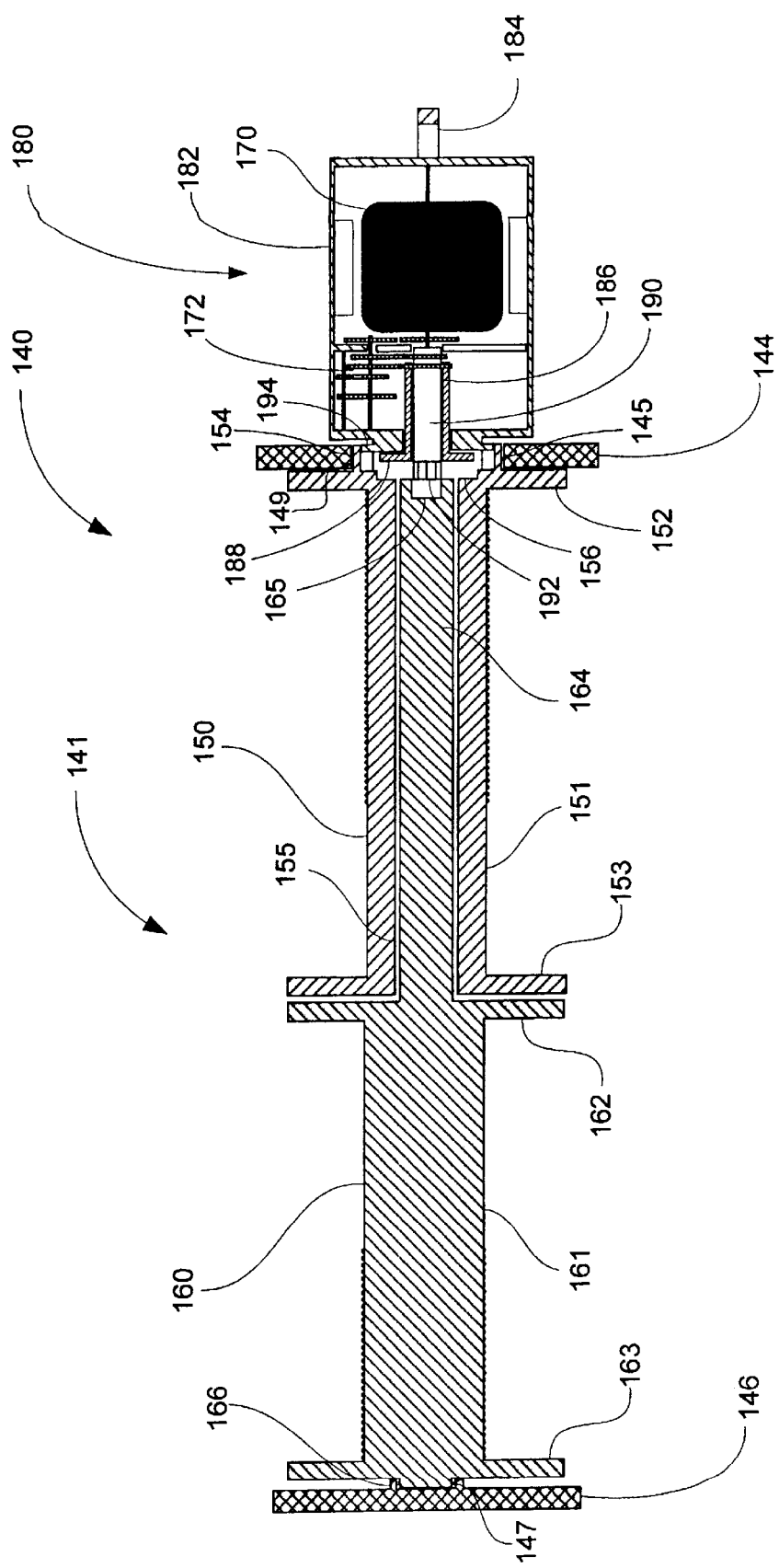
FIG. 10 is a section view of the winch assembly and portable power unit of FIG. 9.

As shown in FIG. 10, the first reel 150 has a coaxial, cylindrical center perforation 155 formed through the first reel drum 151 and the first reel flanges 152, 153. The center perforation 155 is sized to accommodate an elongate, cylindrical forward axle 164 attached to the inner flange 162 of the second reel 160. The elongated axle 164 and the center perforation 155 are configured so that the center perforation 155 of the first reel acts as a bearing for the forward axle 164 of the second reel. This configuration allows the first and second reels 150, 160 to be joined as a cooperative reel unit 141 while maintaining the capability of independent rotation.

The first reel 150 has an annular axle portion 154 that extends outward from the outward circular flange 152 and is supported by a bearing 145 positioned in a central opening 149 of the first mounting plate 144. The second reel 160 has a rear axle 166 that extends outward from the second flange 163 of the second reel 160. The rear axle 166 is supported by an annular bearing 147 attached to the second mounting plate 146. The reel unit 141 is thus supported by the forward axle 154 of the first reel 150 and the rear axle 166 of the second reel 160.

Figure 7:
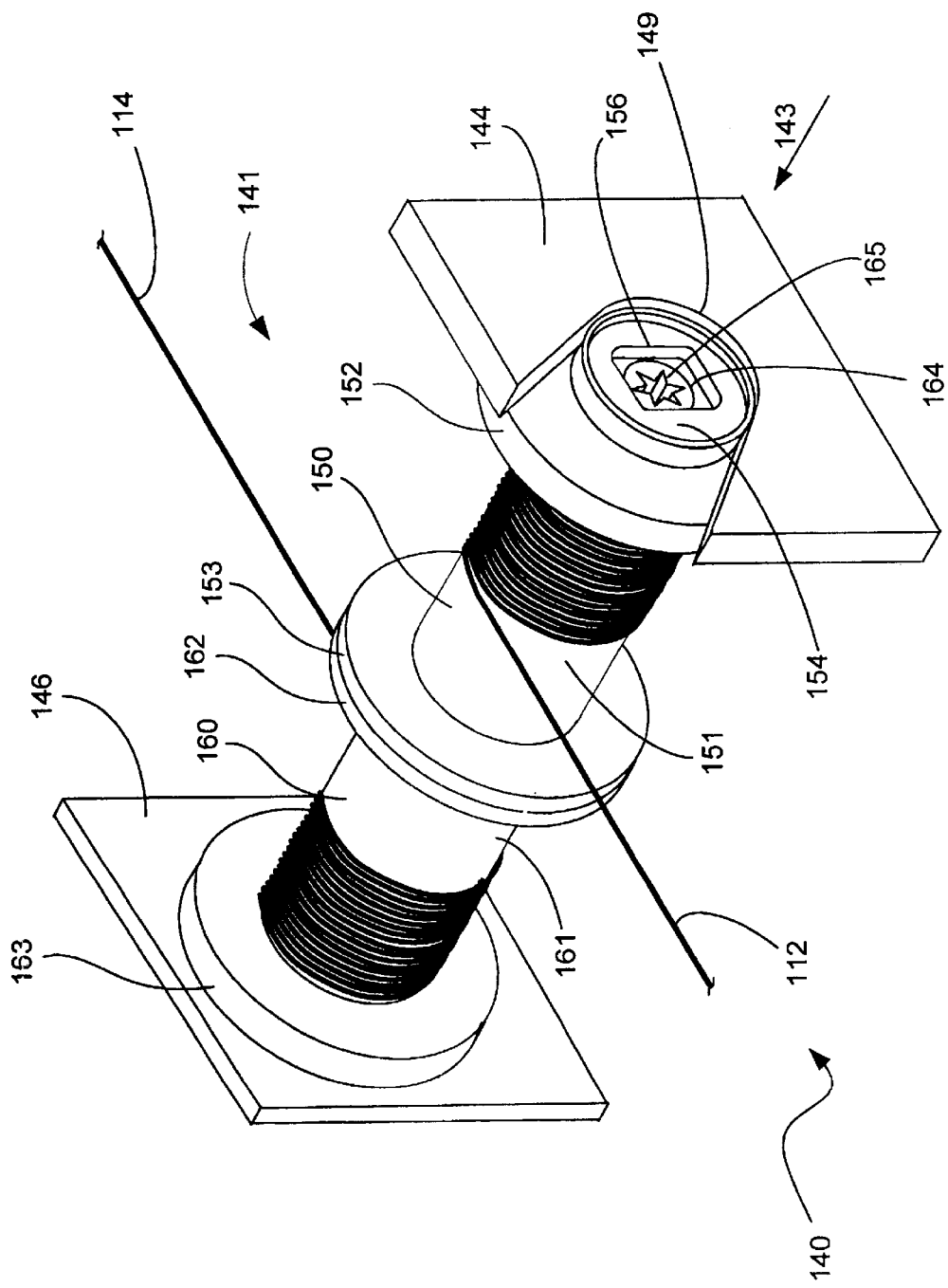
FIG. 7 is a perspective view of a winch assembly of a loading system according to an embodiment of the invention.

The first and second reels 150, 160 each include an arrangement for being selectively rotated. The first flange 152 of the first reel 150 includes a first keyway 156 that is shaped for engagement with a key block of a driving tool as will be discussed in more detail hereafter. As shown in FIG. 7, the first keyway 156 has a substantially square cross-section with slightly rounded corners and is centered on the axis of rotation 148 of the reels 150, 160. The shape of the first keyway 156 allows the selective rotation of the first reel 150 using a tool having a key block with a complementary square shape.

The second reel 160 includes a second keyway 165 formed at the distal end of the elongate forward axle 164. Like the first keyway 156, the second keyway 165 is shaped for engagement with a key block of a driving tool as will be discussed in more detail hereafter. The second keyway 165 preferably has a different cross-sectional shape from the first keyway 156. As shown in FIG. 7, the second keyway 165 may have a star-shaped cross-section that is centered on the axis of rotation 148 of the reels 150, 160. This shape allows the selective rotation of the second reel 160 using a tool having a key block with a complementary star shape.

The first reel 150 may be used to wind and unwind the forward cable 112 and the second reel 160 may be used to wind and unwind the rear cable 114 or vice versa. The cables 112, 114 are preferably wound on the first and second reels 150, 160 so that the two reels 150, 160 will rotate in the same direction to wind the cables 112, 114 and to unwind the cables 112, 114. It will be understood, however, that because the two reels 150, 160 are independently rotatable, the cables 112, 114 may be wound in opposite directions.

In the illustrated embodiment, the first reel 150 winds the first cable 112 when the first reel 150 is rotated clockwise as viewed in the direction indicated by reference number 143 in FIG. 7. The second reel 160 winds the second cable 114 when the first reel 160 is rotated clockwise as viewed in the direction indicated by reference number 143. Accordingly, simultaneous rotation of both reels 150, 160 in the clockwise direction results in the simultaneous raising of the two hooks 110 and, if attached to the hooks 110, a stores item to be loaded onto the release unit 60. Conversely, simultaneous rotation of both reels 150, 160 in the counter-clockwise direction results in the simultaneous lowering of the two hooks 110.

The coaxial mounting of the reels 150, 160 allows the reels 150, 160 to be simultaneously driven using a single tool having a driving head shaped to conform to both the first keyway 156 and the second keyway 165. Importantly, however, the reels 150, 160 may also be driven independently, which provides a significant improvement over previous systems that used winching systems with coaxially mounted reels. It is often the case with multiple cable loading systems that cable stretch or other rigging anomaly can cause a stores item to be raised unevenly. This can cause significant difficulty and can even prevent the mating of the stores item to the release unit. Heretofore, this has caused even greater problems for loading systems that use multiple coaxially mounted reels. When the cables of these systems become uneven due to asymmetric stretching, the loading operation typically must be suspended so that the cables can be rewound.

The independently drivable reels 150, 160 of the winch assembly 140 eliminate this problem. If either of the cables 112, 114 is disproportionately stretched, the operator of the winch assembly 140 may cause the independent rotation of the reel with the stretched cable so as to even out the length of the two cables 112, 114. Once the cables 112, 114 are even and the stores item being loaded is leveled out, the reels 150, 160 can be simultaneously driven to raise the stores item into place.

The winch assembly 140 may include a ratcheting arrangement (not shown) that allows the reels 150, 160 to rotate in a selected direction but not in the opposite direction. The arrangement preferably includes the capability of reversing the rotation direction. The ratcheting arrangement may include the capability of releasing the reels 150, 160 so that the cables wound on the reels 150, 160 can be easily unwound by hand.

While the above-described winch assembly 140 is particularly well adapted for use in the loading system 100, it will be understood that other winch mechanisms may be used, particularly if space limitations prevent the use of a coaxial reel winch. For example, a separate winch may be provided for each cable 112, 114 without departing from the scope of the invention. In another embodiment, a winch assembly may include an expanding sheave linear drive that provides the capability of simultaneously winding two cables on non-concentric drums.

Figure 8:
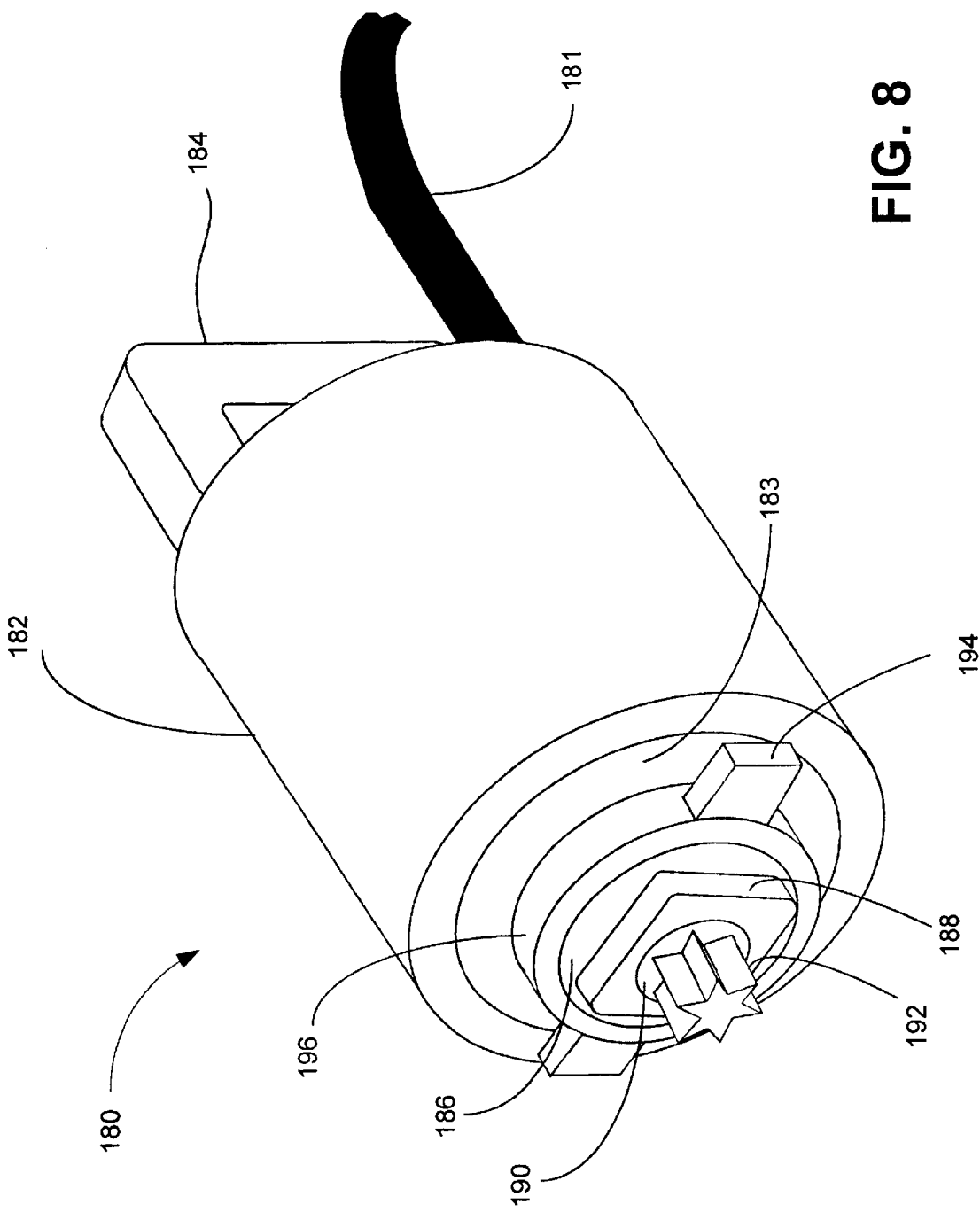
FIG. 8 is a perspective view of a portable power unit of a loading system according to the present invention.
Figure 9:
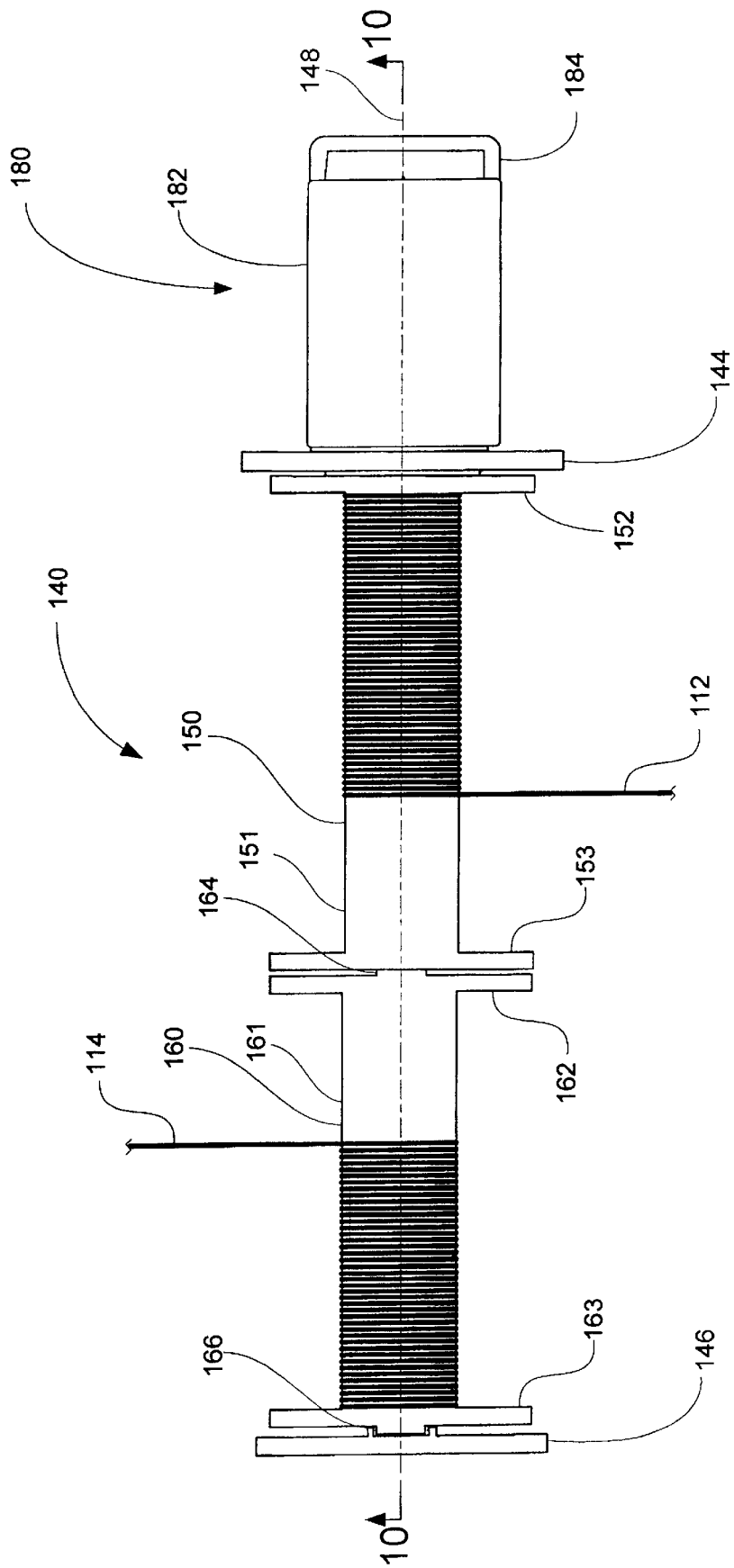
FIG. 9 is a side view of a winch assembly and a portable power unit of a loading system according to an embodiment of the invention.
Figure 11:
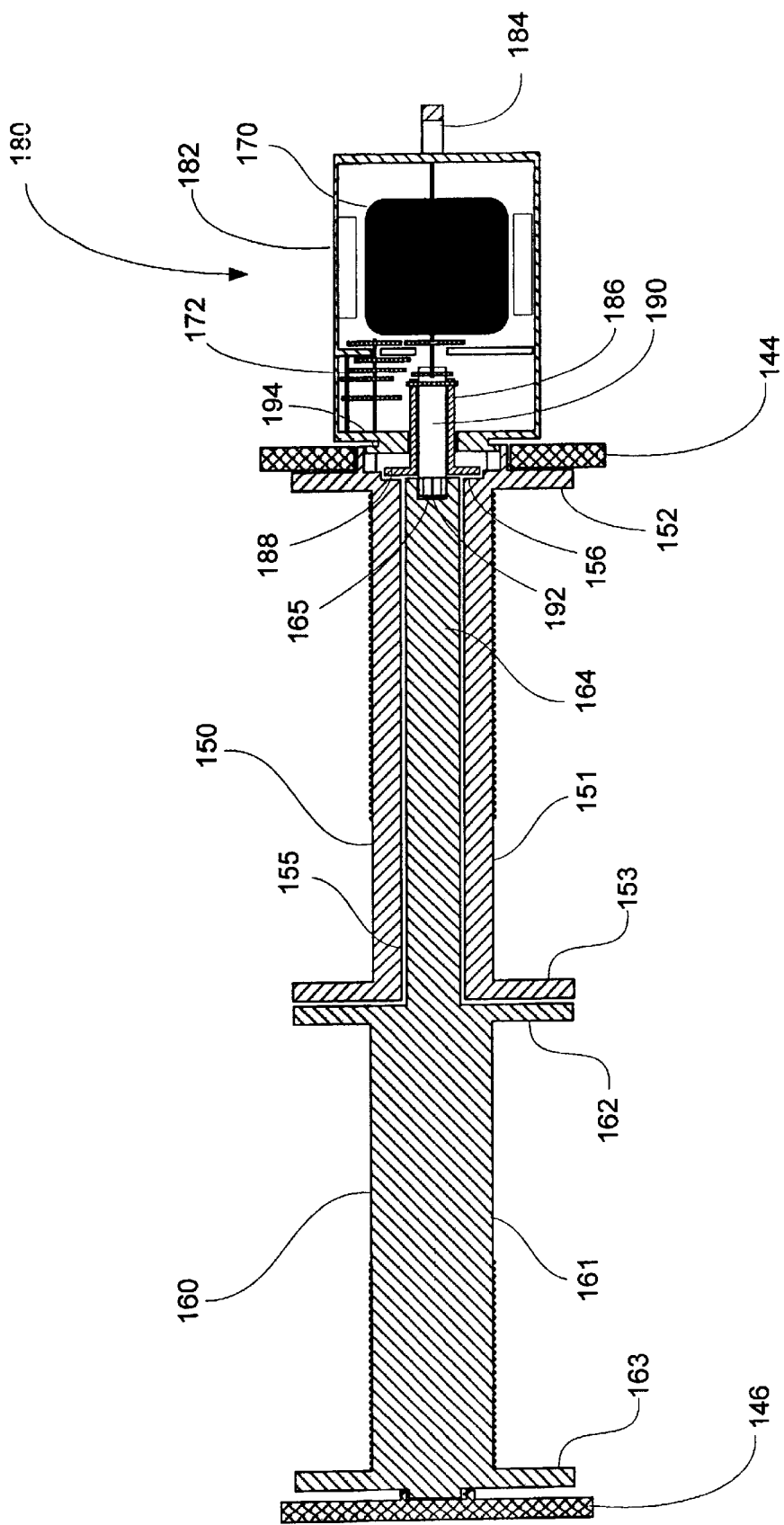
FIG. 11 is a section view of the winch assembly and portable power unit of FIG. 9.

The loading system 100 includes a portable power unit 180 that is configured for driving either or both of the reels 150, 160 of the winch assembly 140. The portable power unit 180 provides a lightweight, easily manipulable tool that is usable by a single operator to drive the reels 150, 160 of the winch assembly 140. With reference to FIGS. 8 and 11, the portable power unit 180 includes a motor 170 housed in a generally cylindrical casing 182, a power transmission arrangement 172, a first drive cylinder 186, a second drive cylinder 190 and a power cord 181.

The motor 170 receives power from a power source (not shown) through the power cord 181 and converts it to rotational energy. A power transmission arrangement 172 is used to convert the rotational energy of the shaft of the motor 170 to rotation of either or both of the drive cylinders 186, 190. As will be discussed, the drive cylinders 186, 190 are configured for engaging and driving the reels 150, 160 of the winch assembly 140.

The motor 170 is preferably configured to be driven by a power source that is readily available in stores loading areas. For shipboard applications, the motor is preferably configured to be powered by the ship's electrical power system. Such a system typically provides 115 V, three phase DC current at 60 Hz. at a plurality of electrical service stations. The power cord 181 is used to provide selective electrical power from the power source to the motor 170. The power cord 181 may be used to connect to existing electrical power outlets or may be used in conjunction with a multiple outlet power strip that may be used to electrically connect the power cord 181 to the power source.

In an alternative embodiment, the motor 170 may be adapted for compatibility with the on-board electrical systems of aircraft to be loaded. In an exemplary embodiment, the motor 170 may be configured to be driven by a 28 V DC power source such as may be found in a typical fighter aircraft. In such an embodiment, the power cord 181 would be adapted for connection to an outlet provided on the aircraft being loaded. This embodiment provides significant advantages in that all aspects of the loading system are on-board the aircraft except the portable power unit 180. This would be particularly advantageous for non-shipboard operations where standardized power sources may not be available.

The first drive cylinder 186 is an annular sleeve having a first drive key 188 at its distal end. The first drive key 188 is formed with a substantially square cross-section that is complementary to the cross-section of the first keyway 156. The first drive key 188 is sized so that it may be inserted into and engage the walls of the first keyway 156 so that rotation of the first drive cylinder 186 will cause rotation of the first reel 150 of the winch assembly 140.

The first drive cylinder 186 includes a center perforation sized to accommodate the outer diameter of the second drive cylinder 190, which is coaxial with the first drive cylinder 186 and telescopically disposed therein. The second drive cylinder 190 includes a second drive key 192 attached to its distal end. The second drive key 192 is formed with a star-shaped cross-section that is complementary to the cross-section of the second keyway 165. The second drive key 192 is sized so that it may be inserted into and engage the walls of the second keyway 165 so that rotation of the second drive cylinder 190 will cause rotation of the second reel 160 of the winch assembly 140.

The drive cylinders 186, 190 are configured so that they may be independently translated along their common axis of rotation. This allows the drive keys 186, 190 each to be moved between a retracted position and an extended position.

The power transmission arrangement 172 uses a plurality of gears and clutches to convert rotational energy of the shaft of the motor 170 to rotation of the drive cylinders 186, 190. The power transmission arrangement 172 is configured so that the drive cylinders 186, 190 can be selectively shifted between their retracted positions and their extended positions. The motor 170 and power transmission arrangement 172 are controlled by a control unit (not shown) that may be attached to or integrated with the housing 182 or handle 184 of the portable power unit 180.

With reference to FIGS. 9–13, the portable power unit 180 is configured to engage the first mounting plate 144. The power unit 180 may include an arrangement for guiding and attaching the power unit 180 in place. This arrangement may include a guide cylinder 196 extending from the forward face 183 of the housing 182. The guide cylinder 196 is coaxial with the drive cylinders 186, 190 and is sized to be inserted into the opening 149 to align the drive cylinders 186, 190 with the reel axis 148. It will be understood that although the guide cylinder 196 and the flange opening 149 are shown as having a circular cross-section, other cross-section shapes may also be used including regular and irregular polygons, ellipses and ovals. The arrangement for aligning and attaching may also include one or more tangs 194 attached to the guide cylinder 196. The tangs 194 may be used to secure the power unit housing 180 to the first mounting plate 144 and to assist in countering the torque on the housing 180 when the motor 170 is used to drive the reels 150, 160 of the winch assembly 140. In some embodiments, the flange opening, 149 may include slots radiating from the central portion of the opening to accommodate the tangs 194. In an alternative embodiment, the tangs 194 may be configured and positioned to engage a portion of the pylon 20 or other aircraft structure to which the winch assembly 140 is mounted.

FIGS. 10–13 illustrate four conditions of operation in which the power unit 180 is engaged with the first mounting plate 144. In the first condition, illustrated in FIG. 10, the drive cylinders 186, 190 are both in their retracted positions. In this condition, neither the first reel 150 nor the second reel 160 is engaged by the power unit. In the second condition, illustrated in FIG. 11, both the first drive cylinder 186 and the second drive cylinder 190 are in their extended positions. With the first drive cylinder 186 in its extended position, the first drive key 188 is positioned to engage the walls of the first keyway 156 so that rotation of the first drive cylinder 186 will cause the first reel 150 to rotate. With the second drive cylinder 190 in its extended position, the second drive key 192 is positioned to engage the walls of the second keyway 165 so that rotation of the second drive cylinder 190 will cause the second reel 160 to rotate.

Figure 12:
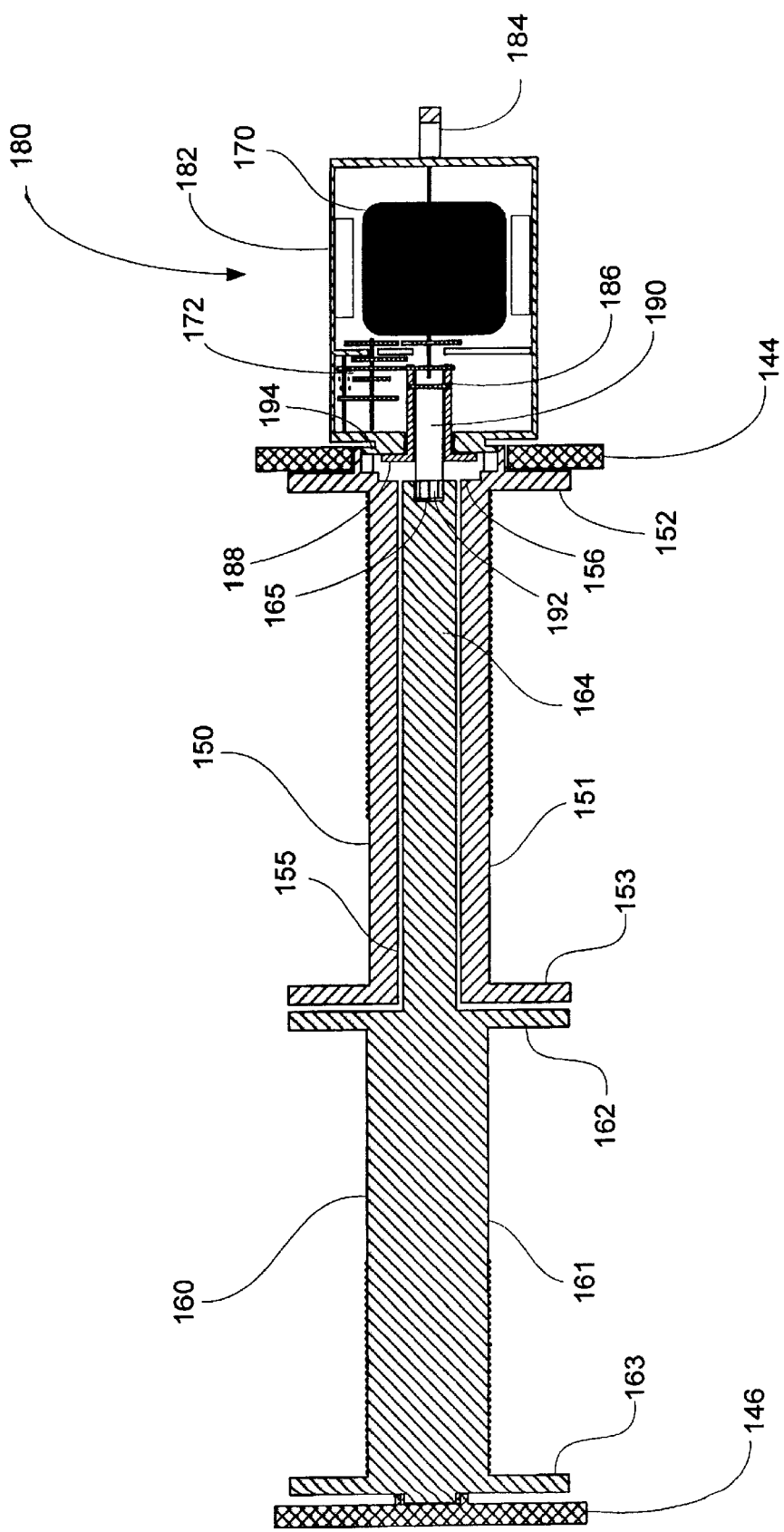
FIG. 12 is a section view of the winch assembly and portable power unit of FIG. 9.

In the third condition, illustrated in FIG. 12, the first drive cylinder 186 is in its retracted position and the second drive cylinder 190 is in its extended position. In this condition, the second drive key 192 is in position to drive the second reel 160 but the first drive key 188 is not in position to drive the first reel 150. This is the condition the power unit 180 would be in if the rear cable 114 and attached hook 110 are to be raised (or lowered) but the forward cable 112 and attached hook 110 are not.

Figure 13:
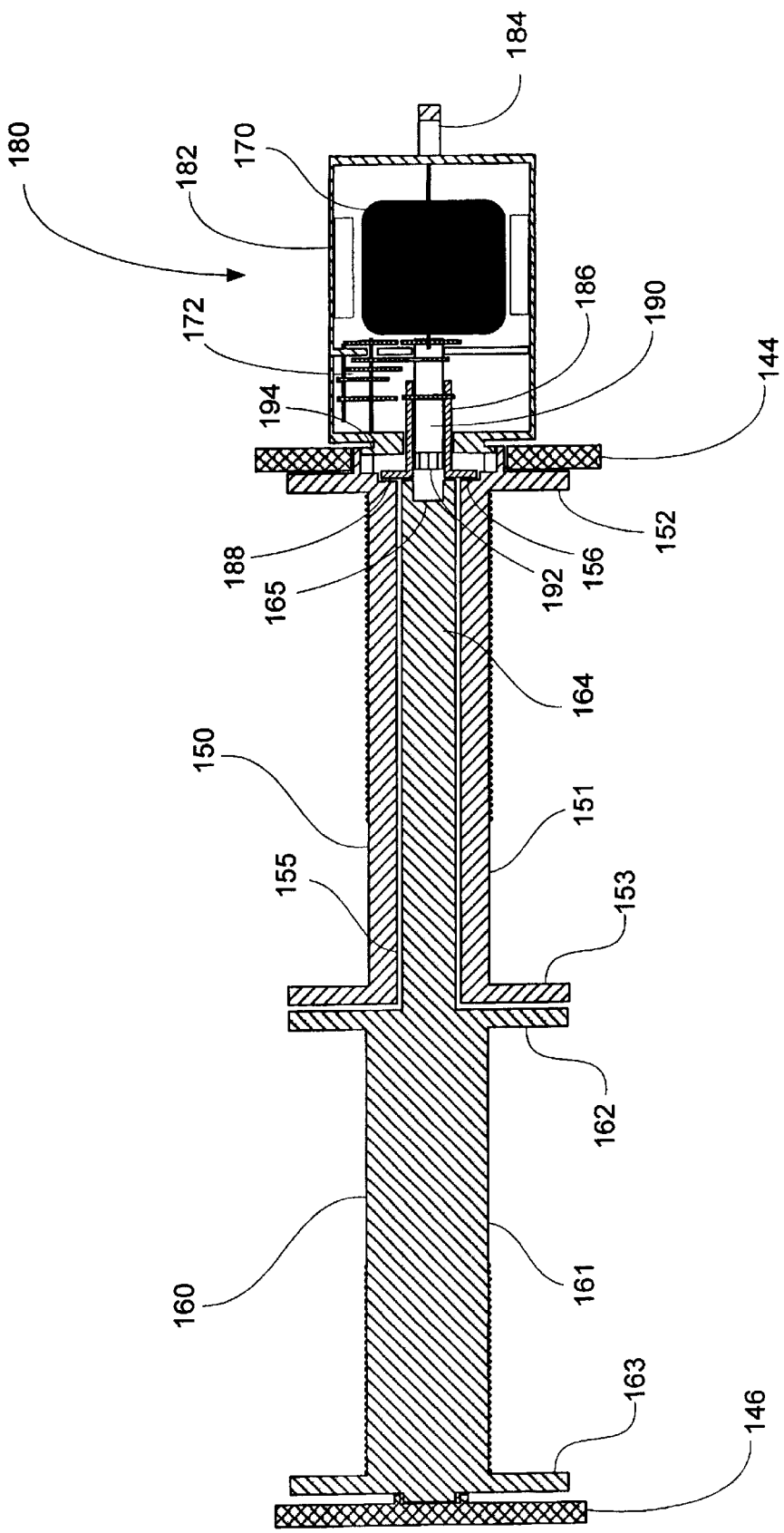
FIG. 13 is a section view of the winch assembly and portable power unit of FIG. 9.

In the fourth condition, illustrated in FIG. 13, the first drive cylinder 186 is in its extended position and the second drive cylinder 190 is in its retracted position. In this condition, the first drive key 188 is in position to drive the first reel 150 but the second drive key 192 is not in position to drive the second reel 160. This is the condition the power unit 180 would be in if the forward cable 112 and attached hook 110 are to be raised (or lowered) but the rear cable 114 and attached hook 110 are not.

In an alternative embodiment, the drive cylinders 186 and 190 are not movable along their axis of rotation, but are instead maintained in the extended position shown in FIG. 11. In this embodiment, both drive keys 188, 192 are inserted into and engage their associated keyways 156, 165 and remain engaged for as long as the power unit 180 is engaged with the mounting plate 144. The reels 150, 160 are separately (or simultaneously) driven depending on which of the drive cylinders 186, 190 are engaged by the power transmission arrangement 172.

In either embodiment, power unit 180 is configured so that the driving of each reel 150, 160 may be automatically stopped when a predetermined level of resistance is encountered. In this way, the loading system can automatically compensate if one end of a stores item reaches its position against the release unit 60 before the other end does.

The winch assembly 140 is mounted to the pylon 20 in a location that allows easy access to the winch assembly 140 by a crewman handling the portable power unit 180. An access door may be provided so that the winch power unit interface portion of the winch assembly is not exposed during flight.

Aspects of the present invention provide methods of using the loading system 100 to load stores items on a release unit 60 attachable to an aircraft structure such as a pylon 20. In an illustrative method, the winch assembly 140 of the loading system 100 is mounted within the interior cavity 22 of the pylon 20 along with a plurality of pulleys 142 for routing the cables 112, 114 to the release unit. The hooks 110 are initially pivotally connected to the release actuation assembly 70 by the pivot pin 123. If the release unit 60 is not already attached to the aircraft structure, the method begins with the attachment of the release unit 60. When the release unit 60 is attached to the aircraft structure, the cables 112, 114 are attached to the hooks 110. If the hooks 110 are connected to (or engaged by) actuator arms 72, the hooks are disconnected (or disengaged) from the actuator arms 72. If the hooks 110 are connected to the actuator arms 72 by actuator pins 127, the actuator pins 127 are removed from the respective actuator pin passages 126. The hooks 110 are then detached from the release actuation assembly 70 by removing the pivot pins 123. The disconnected hooks 110 are then lowered to a position adjacent the lugs or lift rings of the stores item to be loaded. The hooks 110 can be lowered by releasing the reels 150, 160 to allow the cables 112, 114 to unwind when manual tension is applied to the hook ends of the cables 112, 114. Alternatively, the hooks 110 may be lowered by driving the first and second reels 150, 160 of the winch assembly 140 by driving the reels 150, 160 in a direction whereby the cables 112, 114 are unwound from the reel drums, 151, 161.

Once lowered, the hooks 110 may be caused to engage the lugs or lift rings of the stores item. The reels 150, 160 are then driven in a direction that causes the winding of the cables 112, 114 on the reel drums 151, 161. In most instances, the reels 150, 160 are preferably driven simultaneously until at least one of the hooks 110 is raised into position for reconnection to the release actuation assembly 70. When the at least one hook 110 is in such position, the associated pivot pin 123 is re-inserted into the pivot passage 122 of the hook 110 and the hook mounting portion 76 of the release actuation assembly 70. If the remaining hook 110 is also in position, it too may be reconnected to the release actuation assembly 70. If it is not in position, the reel associated with the cable attached to the remaining hook 110 may be individually driven to further wind the cable until the remaining hook 110 is in proper position at which time the pivot pin 123 may be inserted to connect the hook 110 to the release actuation assembly 70. If actuator pins 127 are required, these may be inserted through the actuator pin passage 126 and the distal end 74 of the actuator arm 72 to pivotably attach the hook 110 to the actuator arm 72.

The steps of the above method wherein the reels 150, 160 are driven to wind or unwind the cables 112, 114 may be accomplished through the use of powered or unpowered tools configured for engaging the keyways 156, 165 of the first and second reels 150, 160. These steps are preferably accomplished using the portable power unit 180, which is configured for selectively driving either one or both of the reels 150, 160.

The loading system of the present invention is discussed primarily in the context of release units that use two hooks to secure stores items. It will be understood, however, that the invention may be used with any release unit using one or more hooks. The winch assembly can be modified to accommodate as many cable reels as desired and as space allows, each reel being independently drivable.

The present invention provides loading systems that will require less time and less personnel to load weapons or other stores onto strike, antisubmarine warfare (ASW) and support aircraft, both shore and carrier based. These systems take advantage of existing hardware with minimal modification and do not require the use of additional rigging. Moreover, these systems can be made entirely independent of shipboard or ground-based power supplies through the use of a power unit that can be connected to the power systems of the aircraft.

Other embodiments and uses of the invention will be apparent to those skilled in the art from consideration of the specification and practice of the invention disclosed herein. The specification and examples should be considered exemplary only. The scope of the invention is limited only by the claims appended hereto.

What is claimed is:

1. A loading system for loading a stores item onto a release unit attachable to an aircraft structure, the release unit comprising a release actuation assembly including an actuator arm, the loading system comprising:

at least one hook pivotably mountable to the release actuation assembly, each of the at least one hook including a pivot pin passage formed therethrough, a stores engagement portion configured for engaging a lifting structure of the stores item and an actuation portion configured for engagement by the actuator arm of the release actuation assembly to pivot the at least one hook and disengage the stores engagement portion from the lifting structure of the stores item;

a pivot pin configured for insertion into the pivot pin passage, the pivot pin being removably mountable to the release actuation assembly for pivotably mounting the at least one hook thereto;

at least one cable, each of the at least one cable being attached to an associated one of the at least one hook; and a winch assembly attachable to the aircraft structure and configured for selectively winding and unwinding each of the at least one cable.

2. A loading system according to claim 1 wherein the actuation portion of each of the at least one hook includes an actuator pin passage formed therethrough and wherein the loading system further comprises an actuator pin configured for insertion into the actuator pin passage, the actuator pin being removably mountable to the actuator arm for pivotably connecting the actuator arm to the actuation portion of the at least one hook.

3. A loading system according to claim 1 wherein the winch assembly includes a reel unit having a reel for each of the at least one cable, each reel being configured for being selectively rotated to wind and unwind its associated cable, the reel unit being configured so that each reel may be rotated independently of each other reel.

4. A loading system according to claim 3 wherein the reel unit includes a first reel comprising:
      forward and rearward first reel flanges connected by a first cylindrical drum having an axis of rotation,
      a cylindrical forward first reel axle extending forward from the forward first reel flange, the forward first reel axle being coaxial with the axis of rotation, and
      a cylindrical center perforation through the forward and rear first reel flanges, the first cylindrical drum and the forward first reel axle, the center perforation being coaxial with the axis of rotation; and
   a second reel comprising:
      forward and rearward second reel flanges connected by a second cylindrical drum coaxial with the axis of rotation, and
      a cylindrical forward second reel axle extending forward from the forward second reel flange, the second reel axle extending through at least a portion of the center perforation, the second reel axle being configured for rotation within the center perforation.

5. A loading system according to claim 4 wherein the forward first reel axle comprises a proximal end attached to the forward first reel flange and an opposing distal end, a first keyway being formed through the distal end of the first reel axle, the first keyway being configured for receiving a first drive key for engaging the forward first reel axle for rotation of the first reel and wherein the forward second reel axle has a proximal end attached to the forward second reel flange and an opposing distal end, a second keyway being formed through the distal end of the second reel axle, the second keyway being configured for receiving a second drive key for engaging the forward second reel axle for rotation of the second reel.

6. A loading system according to claim 5 wherein the first and second keyways are formed with different geometric cross-sectional shapes.

7. A loading system according to claim 5 further comprising a portable power unit comprising:

an electric motor disposed within a housing, the electric motor having an output shaft;

a power cord in electrical communication with the electric motor, the power cord extending outside the housing and being connectable to an external power source;

a first drive cylinder including opposing proximal and distal first drive cylinder ends, the distal first drive cylinder end extending outside the housing, the first drive cylinder also including a drive cylinder axis of rotation through the proximal and distal first drive cylinder ends, a first drive key formed at the distal first drive cylinder end and a cylindrical central passage through the proximal and distal first drive cylinder ends, the cylindrical central passage being coaxial with the drive cylinder axis of rotation, the first drive key being adapted for engagement with the first keyway;

a second drive cylinder including opposing proximal and distal second drive cylinder ends, the distal second drive cylinder end extending outside the housing, the second drive cylinder also including a second drive key formed at the distal second drive cylinder end, at least a portion of the second drive cylinder being telescopically disposed within the central passage of the first drive cylinder, the second drive cylinder being configured for independent rotation within the central passage, the second drive key being adapted for engagement with the second keyway; and a power transmission arrangement connected to the output shaft of the electric motor and to the first and second drive cylinders, the power transmission arrangement being configured for applying rotational energy from the output shaft to selectively rotate the first drive cylinder, the second drive cylinder or both the first and second drive cylinders.

8. A loading system according to claim 7 wherein the electric motor is adapted to be powered by a 115 Volt, three phase DC power source.

9. A loading system according to claim 7 wherein the external power source is an electrical system of a ship and the power cord is adapted for connection to an electrical service station of the ship.

10. A loading system according to claim 7 wherein the external power source is an electrical system of an aircraft and the power cord is adapted for connection to an electrical outlet located on the aircraft structure.

11. A loading system according to claim 10 wherein the electric motor is adapted to be powered by an aircraft power source.

12. A loading system for loading a stores item onto a release unit attachable to an aircraft structure, the release unit comprising a release actuation assembly including an actuator arm, the loading system comprising:

at least one hook pivotably mountable to the release actuation assembly, the at least one hook including a stores engagement portion configured for engaging a lifting structure of the stores item and an actuation portion configured for engagement by the actuator arm of the release actuation assembly to pivot the at least one hook and disengage the stores engagement portion from the lifting structure of the stores item;

means for pivotably and removably mounting the at least one hook to the release actuation assembly; and means for lowering the at least one hook from the release unit for engagement with the lifting structure of the stores item and for raising the at least one hook into a position where the at least one hook can be mounted to the release actuation assembly using the means for pivotably and removably mounting the at least one hook, wherein the means for lowering and raising the at least one hook is configured to raise and lower each of the at least one hook independently of each other hook.

13. A loading system according to claim 12 further comprising means for pivotably connecting the actuator arm to the actuation portion of the at least one hook.

14. A loading system according to claim 12 wherein the means for lowering and raising the at least one hook includes a cable for each of the at least one hook and a winch assembly having a reel unit for winding and unwinding each cable, each reel unit being operable independent of each other reel unit.

15. A loading system according to claim 14 wherein the means for lowering and raising the at least one hook includes a portable power unit adapted for selectively rotating the reels of the winch assembly for selectively raising and lowering the at least one hook.

16. A loading system for loading a stores item onto a release unit attachable to an aircraft structure, the release unit comprising a release actuation assembly including an actuator arm, the loading system comprising:

first and second hooks each pivotably mountable to the release actuation assembly, each hook including a pivot pin passage formed therethrough, a stores engagement portion configured for engaging a lifting structure of the stores item and an actuation portion configured for engagement by the actuator arm of the release actuation assembly to pivot the hook and disengage the stores engagement portion from the lifting structure of the stores item;

first and second pivot pins each configured for insertion into the pivot pin passage and being removably mountable to the release actuation assembly for pivotably mounting one of the hooks thereto;

a first cable attached to the first hook;

a second cable attached to the second hook; and a winch assembly attachable to the aircraft structure and configured for selectively winding and unwinding each of the first and second cables.

17. A loading system according to claim 16 wherein the actuation portion of each hook includes an actuator pin passage formed therethrough and wherein the loading system further comprises first and second actuator pins each configured for insertion into the actuator pin passage and being removably mountable to the actuator arm for pivotably connecting the actuator arm to the actuation portion of one of the hooks.

18. A loading system according to claim 16 wherein the winch assembly includes a reel unit having a first reel configured for being selectively rotated to wind and unwind the first cable and a second reel configured for being selectively rotated to wind and unwind the second cable, the reel unit being configured so that the first and second reels may be rotated independently.

19. A loading system according to claim 18 wherein the first reel comprises:

forward and rearward first reel flanges connected by a first cylindrical drum including an axis of rotation, a cylindrical forward first reel axle extending forward from the forward first reel flange, the forward first reel axle being coaxial with the axis of rotation, and a cylindrical center perforation through the forward and rear first reel flanges, the first cylindrical drum and the forward first reel axle, the center perforation being coaxial with the axis of rotation;

and wherein the second reel comprises:

forward and rearward second reel flanges connected by a second cylindrical drum coaxial with the axis of rotation, and a cylindrical forward second reel axle extending forward from the forward second reel flange, the second reel axle extending through at least a portion of the center perforation, the second reel axle being configured for rotation within the center perforation.

20. A loading system according to claim 19 wherein the forward first reel axle comprises a proximal end attached to the forward first reel flange and an opposing distal end, a first keyway being formed through the distal end of the first reel axle, the first keyway being configured for receiving a first drive key for engaging the forward first reel axle for rotation of the first reel and wherein the forward second reel axle has a proximal end attached to the forward second reel flange and an opposing distal end, a second keyway being formed through the distal end of the second reel axle, the second keyway being configured for receiving a second drive key for engaging the forward second reel axle for rotation of the second reel.

21. A loading system according to claim 20 wherein the first and second keyways are formed with different geometric cross-sectional shapes.

22. A loading system according to claim 20 further comprising a portable power unit including:

an electric motor disposed within a housing, the electric motor comprising an output shaft;

a power cord in electrical communication with the electric motor, the power cord extending outside the housing and being connectable to an external power source;

a first drive cylinder comprising opposing proximal and distal first drive cylinder ends, the distal first drive cylinder end extending outside the housing, the first drive cylinder also comprising a drive cylinder axis of rotation through the proximal and distal first drive cylinder ends, a first drive key formed at the distal first drive cylinder end and a cylindrical central passage through the proximal and distal first drive cylinder ends, the cylindrical central passage being coaxial with the drive cylinder axis of rotation, the first drive key being adapted for engagement with the first keyway;

a second drive cylinder comprising opposing proximal and distal second drive cylinder ends, the distal second drive cylinder end extending outside the housing, the second drive cylinder also comprising a second drive key formed at the distal second drive cylinder end, at least a portion of the second drive cylinder being telescopically disposed within the central passage of the first drive cylinder, the second drive cylinder being configured for independent rotation within the central passage, the second drive key being adapted for engagement with the second keyway; and a power transmission arrangement connected to the output shaft of the electric motor and to the first and second drive cylinders, the power transmission arrangement being configured for applying rotational energy from the output shaft to selectively rotate the first drive cylinder, the second drive cylinder or both the first and second drive cylinders.

23. A loading system according to claim 22 wherein the electric motor is adapted to be powered by a 115 Volt, three phase DC power source.

24. A loading system according to claim 22 wherein the external power source is an electrical system of a ship and the power cord is adapted for connection to an electrical service station of the ship.

25. A loading system according to claim 22 wherein the external power source is an electrical system of an aircraft and the power cord is adapted for connection to an electrical outlet located on the aircraft structure.

26. A loading system according to claim 25 wherein the electric motor is adapted to be powered by an aircraft power source.

* * * * *